(12) United States Patent
Destain et al.

(10) Patent No.: US 7,724,432 B2
(45) Date of Patent: May 25, 2010

(54) REAR-PROJECTION SCREEN FOR PROJECTION VIDEO DISPLAY SYSTEM, METHOD OF REAR-PROJECTION COLLIMATION AND PROJECTION VIDEO DISPLAY SYSTEM INCORPORATING THE SAME

(75) Inventors: Patrick R. Destain, Allen, TX (US); Steven E. Smith, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

(21) Appl. No.: 11/948,426

(22) Filed: Nov. 30, 2007

(65) Prior Publication Data

US 2009/0097112 A1 Apr. 16, 2009

Related U.S. Application Data

(60) Provisional application No. 60/979,745, filed on Oct. 12, 2007.

(51) Int. Cl.
*G03B 21/60* (2006.01)
*G03B 21/56* (2006.01)

(52) U.S. Cl. .......... 359/449; 359/460; 359/742
(58) Field of Classification Search .......... 359/443, 359/449, 459, 460, 742–743
See application file for complete search history.

(56) References Cited

U.S. PATENT DOCUMENTS

| 7,095,558 | B2 * | 8/2006 | Yoshikawa et al. | 359/457 |
| 7,245,429 | B2 * | 7/2007 | Yoshikawa et al. | 359/460 |
| 7,253,954 | B2 * | 8/2007 | Peterson et al. | 359/457 |
| 7,253,955 | B2 * | 8/2007 | Watanabe et al. | 359/459 |

* cited by examiner

*Primary Examiner*—Christopher Mahoney
(74) *Attorney, Agent, or Firm*—Charles A. Brill; Wade James Brady, III; Frederick J. Telecky, Jr.

(57) ABSTRACT

Various embodiments of a rear-projection screen, a method of rear-projection collimation and a projection video display (PVD) system. In one embodiment, a rear-projection screen includes: (1) a total-internal-reflection (TIR) fresnel lens configured to aim light received at an incidence angle toward a central axis of the TIR fresnel lens at a convergence angle and (2) a refractive fresnel lens configured to refract the light received from the TIR fresnel lens and at least to reduce the convergence angle.

17 Claims, 7 Drawing Sheets

REAR-PROJECTION SCREEN FOR PROJECTION VIDEO DISPLAY SYSTEM, METHOD OF REAR-PROJECTION COLLIMATION AND PROJECTION VIDEO DISPLAY SYSTEM INCORPORATING THE SAME

CROSS-REFERENCE TO PROVISIONAL APPLICATION

This application claims the benefit of U.S. Provisional Application Ser. No. 60/979,745, filed by Destain on Oct. 12, 2007, entitled "Double Sided Fresnel Lens: Application to Very Short Throw Distances Rear Projection Lens," commonly assigned with the invention and incorporated herein by reference.

TECHNICAL FIELD OF THE INVENTION

The invention is directed, in general, to projection video display (PVD) systems and, more specifically, to a rear-projection screen for a PVD system, a method of rear-projection collimation and a PVD system incorporating the rear-projection screen or the method.

BACKGROUND OF THE INVENTION

Projection video display (PVD) systems based on digital mirror devices (DMDs) have become quite popular owing, in part, to their accurate color rendition, resolution, display size and cost. However, DMD-based rear-projection PVD systems require an elongated optical path between DMD and screen to magnify their images from a fraction of an inch to several feet wide. Front-projection DMD-based rear-projection PVD systems have at their disposal the distance separating the projector from the rear-projection screen. Rear-projection DMD-based rear-projection PVD systems rely in part on cabinet depth to provide that distance: the larger the rear-projection screen size, the greater the required distance and cabinet depth.

Liquid crystal displays (LCDs) and plasma displays, which compete with DMD-based rear-projection PVD systems, do not magnify images and consequently tend to be relatively shallow, perhaps on the order of a few to several inches. Further, their depth is fairly independent of display size. Consumers prefer a shallower cabinet, so reducing cabinet depth in DMD-based rear-projection PVD systems to maintain their competitiveness is an ongoing challenge.

One way to reduce cabinet depth is to use mirrors to fold the optical path. However, once the image is incident on the projection screen, further optical processing is necessary to collimate the light so it is steered toward the viewer. Moreover, that collimation should preserve the intensity and fidelity of the image; it should not attenuate or distort the image. Unfortunately, ever-thinner cabinets cause the angle of incidence to climb. The next generation of DMD-based rear-projection PVD systems may have angles of incidence around 75° relative to normal (90° being parallel to the rear-projection screen). This high angle of incidence presents a significant collimation challenge, and one that the prior art is unable to address without unacceptably dimming or distorting the image or being prohibitively expensive and therefore impractical for use in commercial DMD-based rear-projection PVD systems.

What is needed in the art is a rear-projection screen that can collimate light incident at a large angle relative to normal. What is further needed in the art is a method of rear-projection collimation that can accommodate high angles of incidence. What is still further needed in the art is a DMD-based rear-projection PVD systems that has a lower cabinet depth to screen-size ratio than prior PVD systems.

SUMMARY OF THE INVENTION

To address the above-discussed deficiencies of the prior art, one aspect of the invention provides a rear-projection screen. In one embodiment, a rear-projection screen includes: (1) a total-internal-reflection (TIR) fresnel lens configured to aim light received at an incidence angle toward a central axis of the TIR fresnel lens at a convergence angle and (2) a refractive fresnel lens configured to refract the light received from the TIR fresnel lens and at least to reduce the convergence angle.

Another aspect of the invention provides a method of rear-projection collimation. In one embodiment, the method includes: (1) receiving light at an incidence angle into a TIR fresnel lens, (2) employing the TIR fresnel lens to aim the light toward a central axis thereof at a convergence angle, (3) receiving the light from the TIR fresnel lens into a refractive fresnel lens and (4) employing the refractive fresnel lens to collimate the light.

Yet another aspect of the invention provides a PVD system. In one embodiment, the PVD system includes: (1) a light source configured to generate light, (2) a projection lens, (3) a DMD configured to receive and reflect portions of the light toward or away from the projection lens, (4) DMD control circuitry coupled to the DMD and configured to control the DMD in response to data derived from a video stream and (5) a projection screen, including: (5a) a TIR fresnel lens configured to aim the light received from the projection lens at an incidence angle toward a central axis of the TIR fresnel lens at a convergence angle and (5b) a refractive fresnel lens configured to collimate the light.

BRIEF DESCRIPTION OF THE DRAWINGS

For a more complete understanding of the invention, reference is now made to the following descriptions taken in conjunction with the accompanying drawings, in which.

DETAILED DESCRIPTION

Before describing specific embodiments, it should be noted that the rear-projection screen and method of rear-projection collimation disclosed herein can be used in conjunction with any conventional or later-developed microdisplay, including spatial light modulators (SLMs) such as liquid-crystal-on-silicon (LCoS) devices, liquid crystal displays (LCDs) and DMDs.

Figure 1:
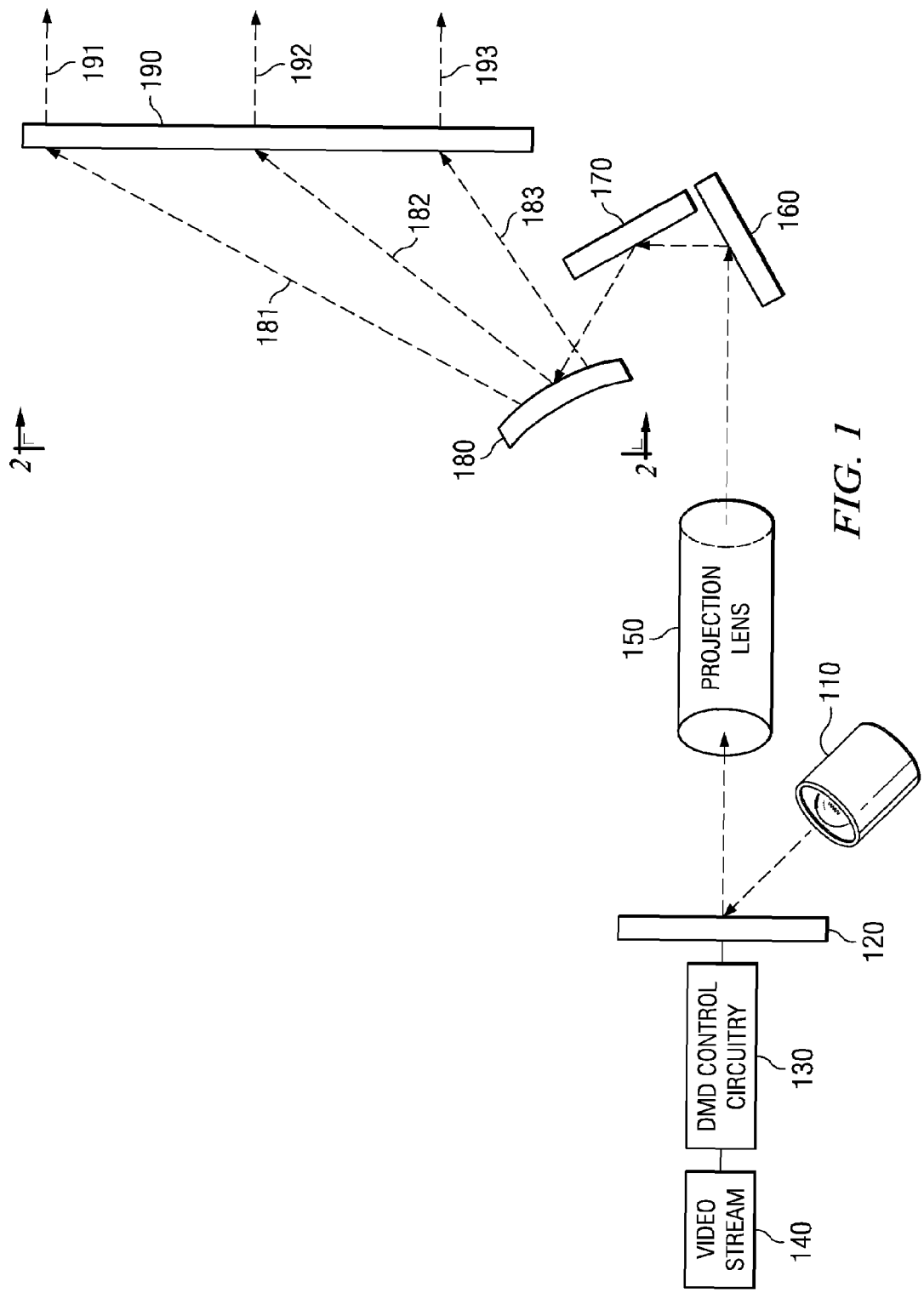
FIG. 1 is a side view of a schematic representation of a DMD-based rear-projection PVD system that incorporates one embodiment of a rear-projection screen constructed according to the principles of the invention.

FIG. 1 is a side view of a schematic representation of a DMD-based rear-projection PVD system that incorporates one embodiment of a rear-projection screen constructed according to the principles of the invention.

A light source 110 is configured to generate light. The light travels along an optical path (not referenced, but a principal ray thereof shown in broken line) to a DMD 120. Those skilled in the pertinent art understand that a DMD has a reflective, mirror face that comprises at least thousands, and typically millions, of individually tiltable micro-mirrors (not shown). The mirrors can be tilted between two extreme angles (e.g., ±12° from a central, untilted position) to reflect light in desired directions. In the embodiment of FIG. 1, DMD control circuitry 130 controls the tilt of each mirror in response to data derived from a video stream 140, which amounts to a sequence of still video frames.

Depending upon the content of the video stream 140, the mirrors reflect portions of the light toward a projection lens 150 or away from the projection lens 150, typically toward a light-absorbing body (not shown).

The light that enters the projection lens 150 is caused to diverge as it exits the projection lens 150. As described above, DMD-based PVD systems require an elongated optical path between DMD and screen to magnify their images from a fraction of an inch to several feet wide. To compress the optical path, the projection lens 150 is typically a short-throw lens. Mirrors may be also employed to fold the optical path and better conform it to a shallow cabinet. Accordingly, FIG. 1 shows light exiting the projection lens 150 and reflecting off first and second generally planar folding lenses 160, 170.

The light then reflects off a convex mirror 180. The convex mirror 180 has a face that is convex along two axes, such that it is a section of a sphere. Consequently, the convex mirror 180 not only folds but also increases the rate at which the optical path diverges. Of course, the convex mirror 180 may be of any curvature or shape and may alternatively be a generally planar mirror without departing from the scope of the invention.

As FIG. 1 schematically indicates, the convex mirror 180 spreads the light over the area of the rear-projection screen 190, as multiple broken-line arrows 181, 182, 183 indicate. The arrows 181, 182, 183 indicate that the light is incident upon a back face of the rear-projection screen 190 at relatively severe angles, e.g., approximately 75° from normal for the arrow 181 toward a distal end of the rear-projection screen 190 (the top of the rear-projection screen 190 as FIG. 1 shows it), approximately 65° from normal for the arrow 182 toward a center of the rear-projection screen 190 and approximately 55° from normal toward a proximal end of the rear-projection screen 190 (the bottom of the rear-projection screen 190 as FIG. 1 shows it). The rear-projection screen 190 is responsible for turning the light and therefore includes lenses. In the PVD system of FIG. 1, the rear-projection screen substantially collimates the light, turning it in a direction substantially normal to a plane of the rear-projection screen 190 and ostensibly toward a person viewing it. Broken-line arrows 191, 192, 193 indicate this substantial collimation.

Figure 2:
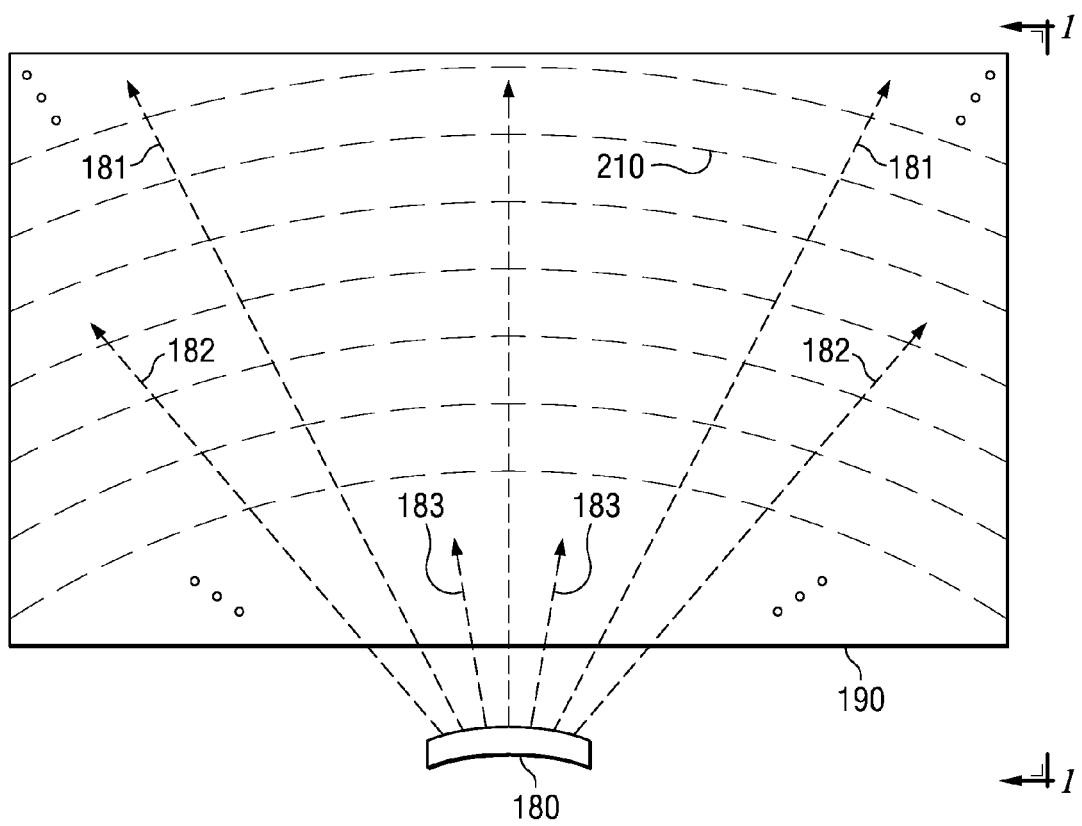
FIG. 2 is an end view of a portion of the schematic representation of the DMD-based PVD system of FIG. 1 taken along lines 2-2 thereof.

FIG. 2 is an end view of a portion of the schematic representation of the DMD-based PVD system of FIG. 1 taken along lines 2-2 thereof. FIG. 2 shows that the light reflected off the convex mirror 180 spreads radially and strikes a rear face (not separately referenced) of the rear-projection screen 190. FIG. 2 also shows schematically that the rear face of the rear-projection screen 190 is divided into a plurality of (generally circularly) curved regions 210. Being highly schematic, FIG. 2 does not show that the rear-projection screen 190 typically contains many hundreds or even thousands of curved regions 210, though unreferenced (triple-dot) ellipses located at corners of the rear-projection screen 190 are intended to indicate this to be the case.

The curved regions 210 correspond to curved elements of lenses in the rear-projection screen 190. More specifically, the rear-projection screen 190 of FIGS. 1 and 2 includes two lenses: a TIR fresnel lens and a refractive fresnel lens. The TIR fresnel lens is configured to aim light received from the projection lens (via, among other things, the convex mirror 180) at various incidence angles toward its central axis at one or more convergence angles. The refractive fresnel lens is configured to refract the light received from the TIR fresnel lens. In a broad sense, the refractive fresnel lens at least reduces the one or more convergence angles. In the more specific embodiment of FIGS. 1 and 2, the refractive fresnel lens substantially collimates the light.

Those skilled in the pertinent art should understand that the rear-projection screen 190 may alternatively be divided into a plurality of straight-line regions. In this case, its central axis would be a plane. The convex mirror 180 would probably be convex about only its horizontal axis, and the light incident on it would already be horizontally diverged. The convex mirror 180 would therefore be responsible for spreading the light vertically over the straight-line regions.

Figure 3A:
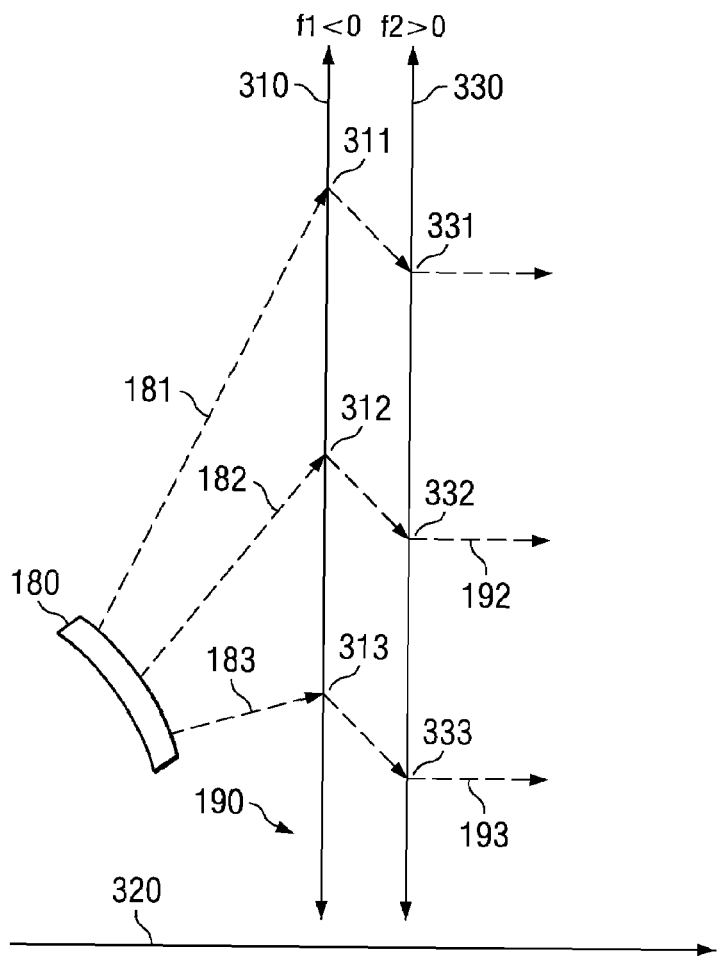
FIG. 3A is a side sectional view of a schematic representation of a portion of a rear-projection screen constructed according to the principles of the invention.

FIG. 3A is a side sectional view of a schematic representation of a portion of the rear-projection screen 190. FIG. 3A is presented primarily for the purpose of providing more detail regarding certain of the optical paths illustrated in FIGS. 1 and 2. The convex mirror 180 is shown with the rays 181, 182, 183 reflected therefrom. The rays 181, 182, 183 are incident at various incidence angles upon a first lens 310 having a central axis 320. The first lens is a TIR fresnel lens having elements. The incidence angles may range between, for example, about 55° and about 75° relative to the central axis 320. The rays 181, 182, 183 are reflected at respective reflection points 321, 322, 323 and aimed toward the central axis 320 at one or more nonzero convergence angles.

A second lens 330, also having the central axis 320 as its central axis, is a refractive fresnel lens also having elements. In the embodiment of FIG. 3A, the elements of the second lens 330 correspond one-to-one with the elements of the first lens 310. The second lens 330 receives the rays 181, 182, 183 and refracts them at respective refraction points 331, 332, 333. While the second lens 330 at least reduces the one or more convergence angles, the second lens 330 substantially eliminates the one or more convergence angles and collimates the light, resulting in the rays 191, 192, 193.

Figure 3B:
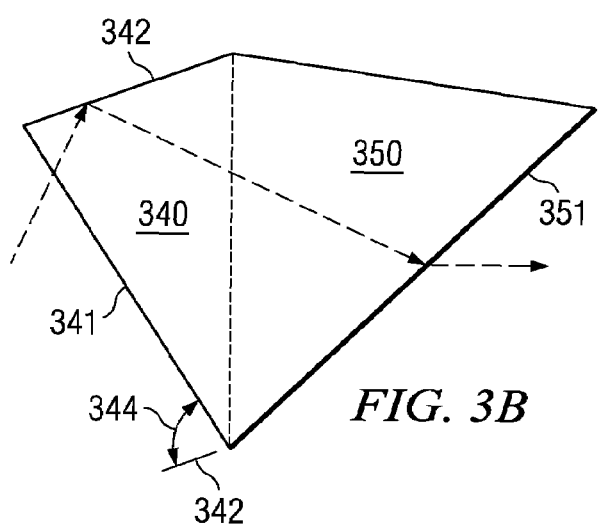
FIG. 3B is an enlarged side sectional view of an element of the rear-projection screen of FIG. 3A.

FIG. 3B is an enlarged side sectional view of an element of the rear-projection screen of FIG. 3A. The element, which in the embodiment of FIGS. 1 and 2 is curved, has first and second prismatic portions 340, 350. In the specific embodiment of FIG. 3B, the first and second prismatic portions are formed of a plastic having a relatively low index of refraction, which may, for example, be polymethyl methacrylate (PMMA). The first and second prismatic portions 340, 350 may be formed separately and thereafter glued or otherwise fixed together in a conventional or later-developed manner or may alternatively be unitary (machined or molded in one piece, without the subsequent need to glue or otherwise fix together).

An interstice (not shown) may separate the first and second prismatic portions 340, 350. The same material that constitutes the first and second prismatic portions 340, 350 may occupy some or all of that interstice, or another medium (e.g., air or a vacuum) may occupy some or all of that interstice. For this reason, FIG. 3B uses a broken line to delineate between the first and second prismatic portions 340, 350.

The first prismatic portion 340 has an entrance face 341 and a reflection face 342, sometimes colloquially referred to as a roof. The second prismatic portion 350 has a refraction face 351. Light (shown but not referenced in FIG. 3B) enters the entrance face 341 and, because its angle of incidence is greater than the critical angle of the reflection face 342, reflects off the reflection face 342. The light is reflected toward the refraction face 351 and, because its angle of incidence is less than the critical angle of the refraction face 351, passes through and is refracted by the refraction face 351. In the embodiment of FIG. 3B, the relative angles of the entrance face 341, the reflection face 342 and the refraction face 351 are chosen such that light enters the entrance face 341, is substantially reflected at the reflection face 342 toward the refraction face 352 and refracted at the refraction face 352 such that it is substantially collimated. Given the disclosure herein, those skilled in the pertinent art will understand how the relative angles of the entrance face 341, the reflection face 342 and the refraction face 351 may be selected given a particular lens material (e.g., PMMA) having a particular index of refraction and therefore a particular critical angle relative to another surrounding medium (e.g., air or a vacuum).

FIG. 3B also illustrates a reflection face 343 of an adjacent element. An angle 344 lies between the entrance face 341 and the reflection face 343. The angle 344 is referred to herein as the groove angle. Steep groove angles are difficult to machine or mold and frequently produce rounded edges, which degrade lens performance. Among other things, the invention recognizes that the groove angle of a TIR fresnel lens can be reduced by allowing it to reflect the light and past the angle at which it is collimated; the subsequent refractive fresnel lens can then cause the light to diverge back to collimation. This is a nonobvious recognition. Prior art lenses invariably steered light toward collimation in one or more stages. No prior art lenses steered away from collimation. The rear-projection screen described herein employs one lens that oversteers light past collimation and another lens that then steers the light back toward collimation. As a result, the groove angle of the first lens can be reduced. In one embodiment, the groove angle varies over the entire TIR fresnel lens between about 40° and about 70°. In another embodiment, the groove angle constant over the entire TIR fresnel lens between about 40° and about 70°. This embodiment of the TIR fresnel lens is properly regarded as an axiconic TIR fresnel lens. In one specific embodiment, the groove angle of an axiconic TIR fresnel lens is held constant at about 57°.

Figure 4A:
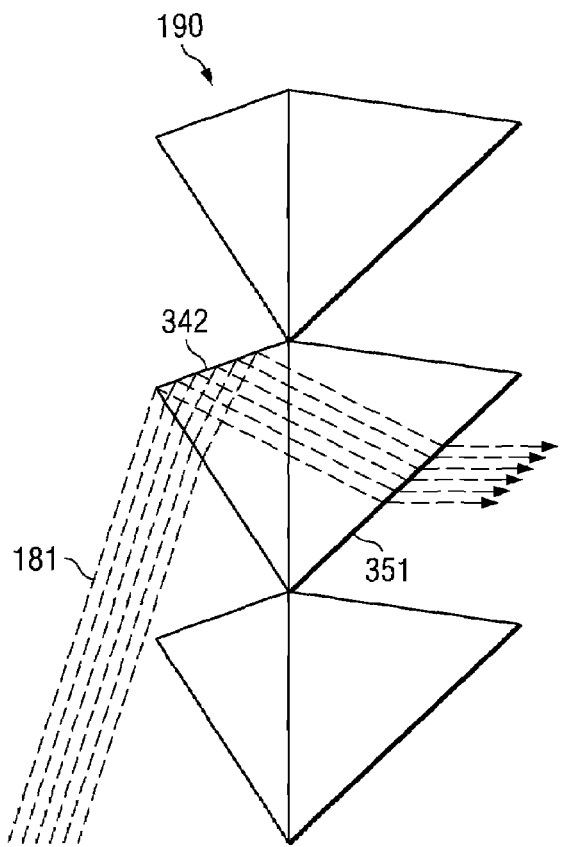
FIGS. 4A and 4B are side sectional views of portions of the rear-projection screen of FIG. 3A that respectively accept light at angles of incidence of about 75° and about 55° and substantially collimate the light.
Figure 4B:
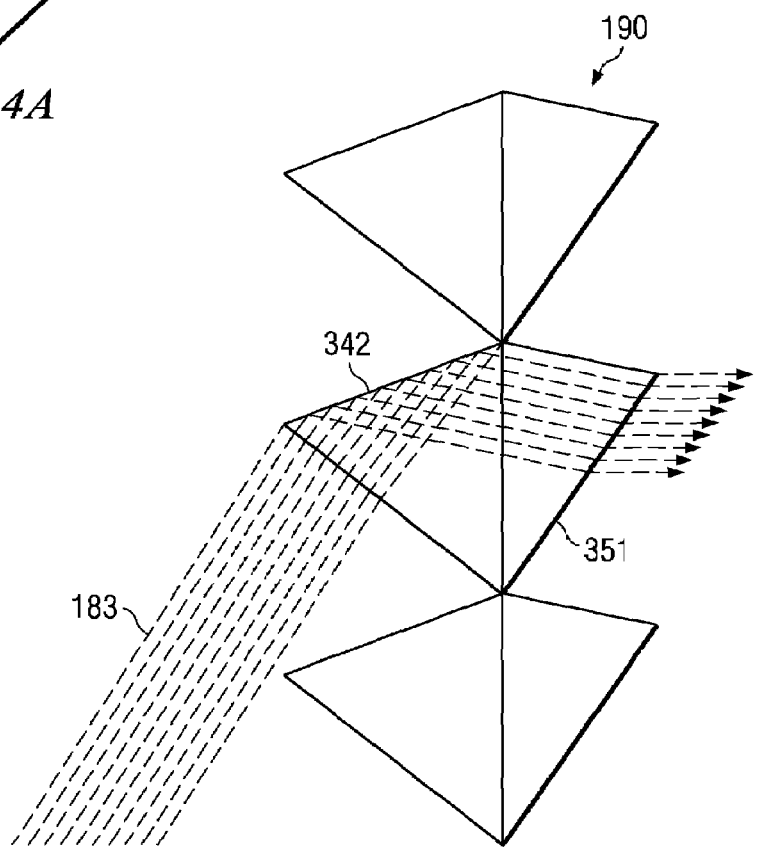

FIGS. 4A and 4B are side sectional views of portions (groups of three elements each) of the rear-projection screen 190 that respectively accept light at angles of incidence of about 75° and about 55° and substantially collimate the light. FIGS. 4A and 4B demonstrate that by varying the angle of one or both of the reflection face 342 and the refraction face 351, light incident at these (and other angles) may be collimated. In theory, an infinite set of angles relating the reflection face 342 to the refraction face 351 exists for every incident angle.

Figure 5A:
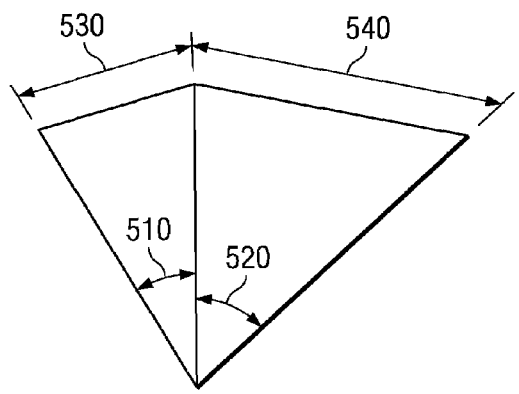
FIGS. 5A-5D are side sectional views of various embodiments of elements of the rear-projection screen of FIG. 3A.
Figure 5B:
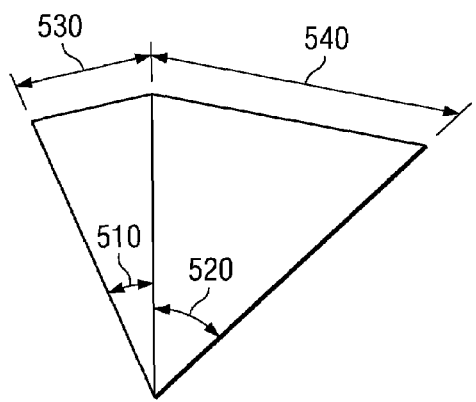
Figure 5C:
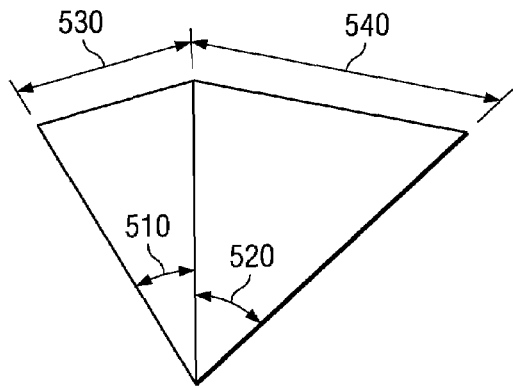
Figure 5D:
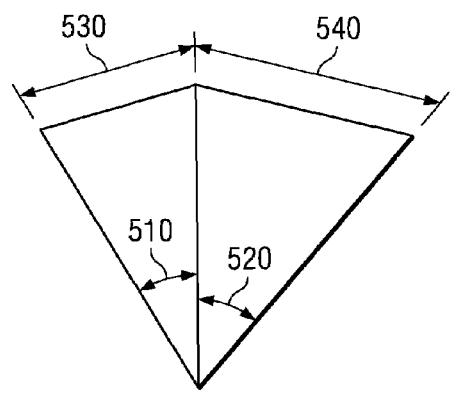

FIGS. 5A-5D are side sectional views of various embodiments of elements of the rear-projection screen 190 of FIG. 3A. FIGS. 5A-5D are presented for the purpose of demonstrating that various different elements may be constructed by varying angles 510, 520 and face lengths 530, 540 as a result. It will be recalled that the angle of incidence of light varies from the proximal end of the rear-projection screen to its distal end. Thus, the elements at the proximal end of the rear-projection screen do not have to steer light through as great an angle as the elements at the distal end of the rear-projection screen. Accordingly, the angle 510 may be changed and the angle 520 held constant as FIGS. 5A and 5B show. Alternatively, the angle 520 may be changed and the angle 510 held constant as FIGS. 5C and 5D show. This is advantageous, since the TIR fresnel lens typically requires deeper cuts than the refractive fresnel lens; keeping the groove angles in the TIR fresnel lens substantially uniform over the whole lens simplifies tooling and makes the lens easier and more economical to manufacture. In one embodiment of the invention, the TIR fresnel lens has a constant groove angle between about 40° and about 70°. In one specific embodiment, the TIR fresnel lens has a constant groove angle of about 57°. Alternatively, of course, both the angles 510, 520 may be changed.

Figure 6:
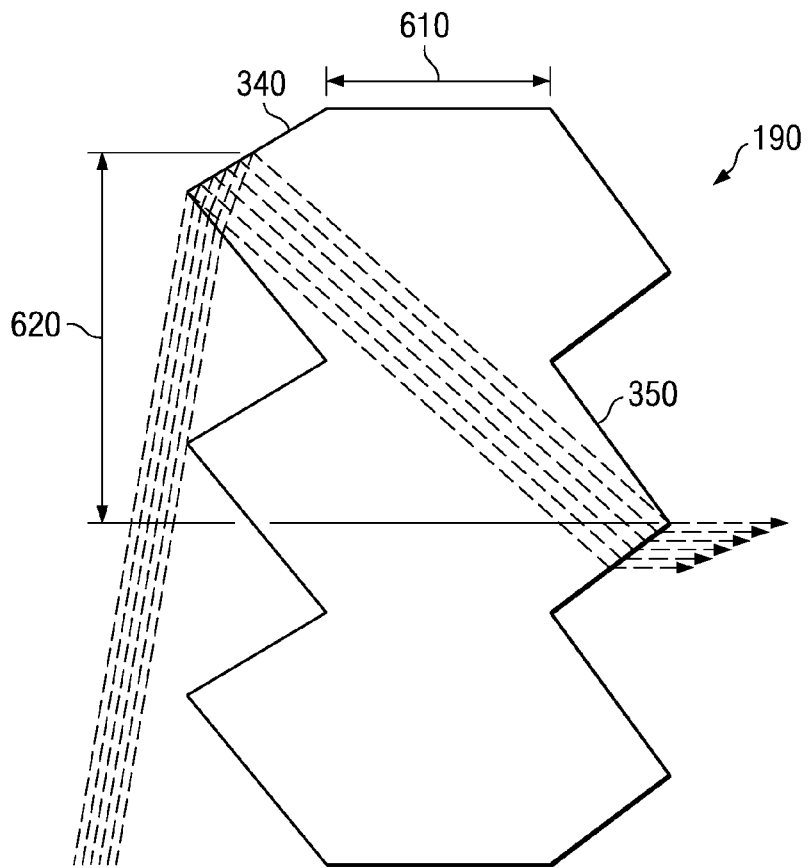
FIG. 6 is a side sectional view of a portion of the rear-projection screen of FIG. 3A in which a thickness of the rear-projection screen affects an offset thereof.

FIG. 6 is a side sectional view of a portion of the rear-projection screen of FIG. 3A in which a thickness of the rear-projection screen affects an offset thereof. As described with respect to FIG. 3B, an interstice 610 may separate the first and second prismatic portions 340, 350 and increase its overall thickness. The same material that constitutes the first and second prismatic portions 340, 350 may occupy some or all of that interstice, or another medium (e.g., air or a vacuum) may occupy some or all of that interstice. FIG. 6 shows that an offset 620 becomes necessary to compensate for the interstice 610 to ensure that light reflected from a particular reflection face is reflected into a particular corresponding refraction face. It is important to not that the interstice 610 and the offset 620 are not shortcomings or disadvantages. Rather, FIG. 6 stands for the proposition that although elements of the TIR fresnel lens and elements of the refractive fresnel lens correspond to one another, they need not be radially aligned with one another; an offset may exist.

Although not a necessary consequence of the invention, one possible advantage of certain embodiments of the rear-projection screen is ambient light rejection. To pass through the rear-projection screen as a whole, light has to pass through and be deviated by both the TIR fresnel lens and the refractive fresnel lens. The prisms in the TIR fresnel lens and the refractive fresnel lens cause relatively significant optical path deviations in opposite directions. The novel serpentine optical path that results can significantly reduce the probability that out-of-field light originating either in the cabinet or in the room in which the cabinet is located can fully traverse the rear-projection screen. Most out-of-field light may therefore be trapped and dissipated in the rear-projection screen as heat.

Figure 7A:
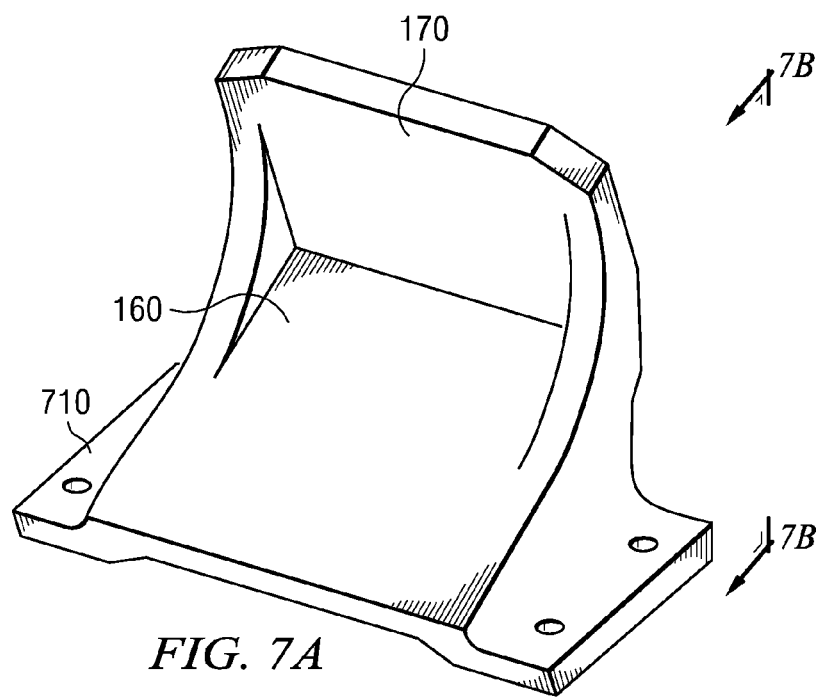
FIGS. 7A and 7B are isometric views of one embodiment of a single-piece, double-fold mirror employable in the DMD-based rear-projection PVD system of FIG. 1 as an alternative to two separate folding mirrors illustrated therein.
Figure 7B:
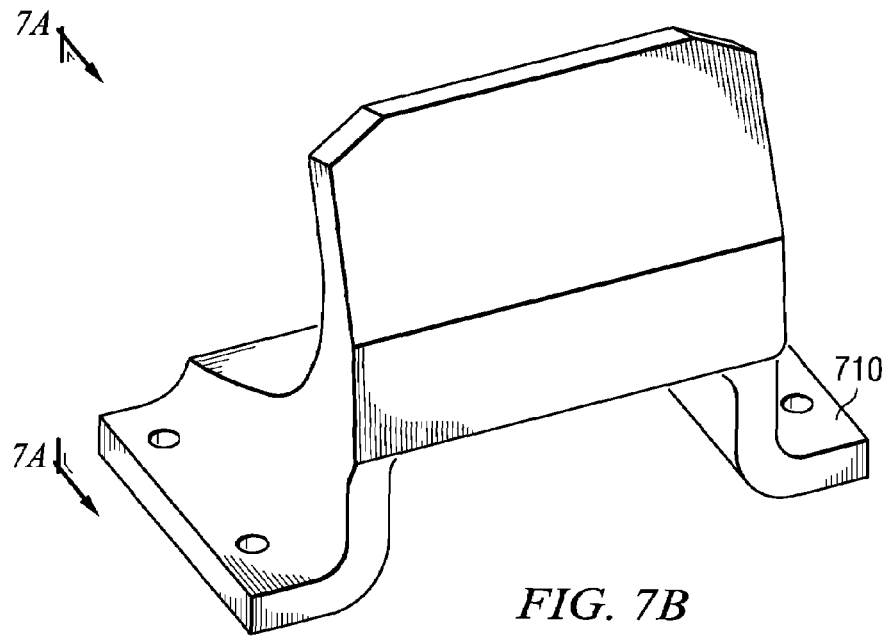

Referring back briefly to FIG. 1, it will be recalled that light reflects off first and second generally planar folding lenses 160, 170 on its way from the projection lens to the convex mirror 180. FIG. 1 illustrates the first and second folding mirrors 160, 170 as being separate. FIGS. 7A and 7B are isometric views of one embodiment of a single-piece, double-fold mirror employable in the DMD-based rear-projection PVD system of FIG. 1 as an alternative to two separate folding mirrors 160, 170. FIG. 7A shows that the integrated, double-fold mirror incorporates portions that replicate the first and second folding mirrors 160, 170. FIGS. 7A and 7B show that the single-piece structure not only fixes the position and orientation of the first and second folding mirrors 160, 170 relative to one another but, by way of a mounting flange 710, fixes their position and orientation to the remainder of the PVD system. Although the invention does not so require, a single-piece, double-fold mirror can yield a DMD-based rear-projection PVD system that is less expensive to manufacture, easier to maintain and reliable to operate.

Figure 8:
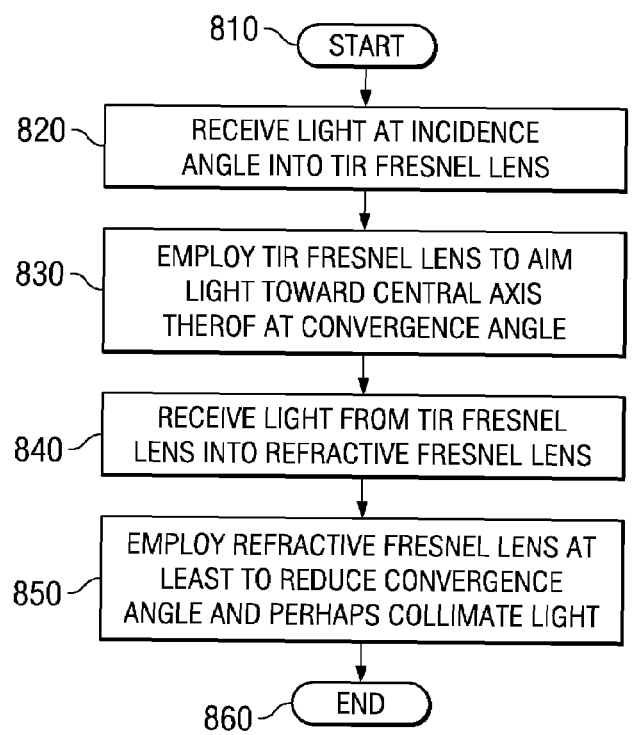
FIG. 8 is a flow diagram of one embodiment of a method of rear-projection collimation carried out according to the principles of the invention.

FIG. 8 is a flow diagram of one embodiment of a method of rear-projection collimation carried out according to the principles of the invention. The method begins in a start step 810.

In a step 820, light is received at an incidence angle into a TIR fresnel lens. In a step 830, the TIR fresnel lens is employed to aim the light toward a central axis thereof at a convergence angle. In a step 840, the light is received from the TIR fresnel lens into a refractive fresnel lens. In a step 850, the refractive fresnel lens is employed at least to reduce the convergence angle and perhaps to collimate the light. The method ends in an end step 860.

Those skilled in the art to which the invention relates will appreciate that other and further additions, deletions, substitutions and modifications may be made to the described embodiments without departing from the scope of the invention.

What is claimed is:

1. A rear-projection screen, comprising:
   a total-internal-reflection Fresnel lens configured to aim light received at an incidence angle toward a central axis of said total-internal-reflection Fresnel lens at a convergence angle, wherein said total-internal-reflection Fresnel lens has elements having reflection faces of uniform angle relative to said central axis; and
   a refractive Fresnel lens configured to refract said light received from said total-internal-reflection Fresnel lens and at least to reduce said convergence angle.

2. The rear-projection screen as recited in claim 1 wherein said refractive Fresnel lens reduces said convergence angle to about 0° thereby to collimate said light.

3. The rear-projection screen as recited in claim 1 wherein said total-internal-reflection Fresnel lens and said refractive Fresnel lens are coaxial about said central axis and have concentric, corresponding elements.

4. The rear-projection screen as recited in claim 1 wherein said incidence angle varies between about 55° and about 75°.

5. The rear-projection screen as recited in claim 1 wherein said total-internal-reflection Fresnel lens has a groove angle between about 40° and about 70°.

6. The rear-projection screen as recited in claim 1 wherein said total-internal-reflection Fresnel lens and said refractive Fresnel lens are embodied in a unitary plastic structure.

7. A method of rear-projection collimation, comprising:
   receiving light at an incidence angle into a total-internal-reflection Fresnel lens, wherein reflection faces of elements in said total-internal-reflection Fresnel lens are of a uniform angle;
   employing said total-internal-reflection Fresnel lens to aim said light toward a central axis thereof at a convergence angle;
   receiving said light from said total-internal-reflection Fresnel lens into a refractive Fresnel lens; and
   employing said refractive Fresnel lens to collimate said light.

8. The method as recited in claim 7 wherein said total-internal-reflection Fresnel lens and said refractive Fresnel lens have corresponding elements and share a central axis.

9. The method as recited in claim 7 wherein said incidence angle is at least about 55° and at most about 75°.

10. The method as recited in claim 7 wherein a groove angle of said total-internal-reflection Fresnel lens is at least about 40° and at most about 70°.

11. The method as recited in claim 8 wherein a unitary structure contains both said total-internal-reflection Fresnel lens and said refractive Fresnel lens.

12. A projection visual display (PVD) system, comprising:
    a light source configured to generate light;
    a projection lens;
    a digital micro-mirror device (DMD) configured to receive and reflect portions of said light toward or away from said projection lens;
    DMD control circuitry coupled to said DMD and configured to control said DMD in response to data derived from a video stream; and
    a projection screen, including:
      a total-internal-reflection Fresnel lens configured to redirect said light received at an incidence angle toward a central axis of said total-internal-reflection Fresnel lens at a convergence angle, wherein said central axis is of a substantially uniform angle with respect to reflection faces of elements of said total-internal-reflection Fresnel lens; and
      a refractive Fresnel lens that configured to collimate said light.

13. The PVD system as recited in claim 12 wherein said refractive Fresnel lens has said central axis as its central axis.

14. The PVD system as recited in claim 12 wherein said incidence angle lies in a range between about 55° and about 75°.

15. The PVD system as recited in claim 12 wherein said total-internal-reflection Fresnel lens has a groove angle that lies in a range between about 40° and about 70°.

16. The PVD system as recited in claim 12 wherein at least one of said total-internal-reflection Fresnel lens and said refractive Fresnel lens contains polymethyl methacrylate.

17. The PVD system as recited in claim 12 further comprising a single-piece, double-fold mirror configured to fold an optical path between said projection lens and said projection screen.

* * * * *